(12) United States Patent
Kemmerling et al.

(10) Patent No.: US 10,006,356 B2
(45) Date of Patent: Jun. 26, 2018

(54) EXHAUST GAS-TURBOCHARGED INTERNAL COMBUSTION ENGINE COMPRISING A RADIAL COMPRESSOR WITH GUIDE DEVICE ARRANGED IN THE DIFFUSER, AND METHOD FOR OPERATING AN INTERNAL COMBUSTION ENGINE OF SAID TYPE

(71) Applicant: Ford Global Technologies, LLC, Dearborn, MI (US)

(72) Inventors: Joerg Kemmerling, Monschau (DE); Helmut Matthias Kindl, Aachen (DE); Vanco Smiljanovski, Bedburg (DE); Franz Arnd Sommerhoff, Aachen (DE); Andreas Kuske, Guelle (NL); Frank Wunderlich, Herzogenrath (DE)

(73) Assignee: Ford Global Technologies, LLC, Dearborn, MI (US)

(*) Notice: Subject to any disclaimer, the term of this patent is extended or adjusted under 35 U.S.C. 154(b) by 210 days.

(21) Appl. No.: 15/048,277

(22) Filed: Feb. 19, 2016

(65) Prior Publication Data

US 2016/0245159 A1 Aug. 25, 2016

(30) Foreign Application Priority Data

Feb. 23, 2015 (DE) ........................ 10 2015 203 171

(51) Int. Cl.
| | |
|---|---|
| *F01D 17/14* | (2006.01) |
| *F01D 17/24* | (2006.01) |
| *F02B 33/40* | (2006.01) |
| *F02B 37/10* | (2006.01) |
| *F02B 37/24* | (2006.01) |

(Continued)

(52) U.S. Cl.
CPC ............ *F02B 37/24* (2013.01); *F04D 17/127* (2013.01); *F04D 29/442* (2013.01); *F04D 29/444* (2013.01); *F02B 37/10* (2013.01); *F02B 39/10* (2013.01); *F05D 2220/40* (2013.01); *Y02T 10/144* (2013.01)

(58) Field of Classification Search
CPC .......... F02B 37/24; F02B 39/10; F02B 37/10; F04D 17/127; F04D 29/442; F04D 29/444; F05D 2220/40; Y02T 10/144
See application file for complete search history.

(56) References Cited

U.S. PATENT DOCUMENTS

| | | | |
|---|---|---|---|
| 3,362,625 | A | 1/1968 | Endress |
| 6,814,540 | B2 | 11/2004 | Sishtla et al. |

(Continued)

FOREIGN PATENT DOCUMENTS

| | | |
|---|---|---|
| DE | 4126907 A1 | 3/1992 |
| DE | 4312077 C1 | 1/1994 |

(Continued)

*Primary Examiner* — Brandon Lee
(74) *Attorney, Agent, or Firm* — Julia Voutyras; McCoy Russell LLP

(57) ABSTRACT

Methods and systems are provided for an adjustable diffuser of a turbocharger compressor. In one example, a compressor includes a diffuser formed in a compressor housing downstream of an impeller of the compressor, the diffuser including guide blades mounted on a rotatable annular support of the diffuser. Further, an engine controller may adjust rotation of the annular support based on one or more engine operating conditions.

18 Claims, 4 Drawing Sheets

(51) Int. Cl.
*F02B 39/10* (2006.01)
*F04D 17/12* (2006.01)
*F04D 29/44* (2006.01)

(56) References Cited

U.S. PATENT DOCUMENTS

2012/0201701 A1    8/2012  Hansen et al.
2013/0136587 A1*   5/2013  Wang ................. F04D 25/0606
                                                                  415/191

FOREIGN PATENT DOCUMENTS

| DE | 10238658 A1    | 3/2004  |
|----|----------------|---------|
| DE | 60307571 T2    | 12/2006 |
| DE | 202014104419 U1| 9/2014  |
| EP | 1811135 A1     | 7/2007  |
| WO | 9613668 A1     | 5/1996  |

\* cited by examiner

EXHAUST GAS-TURBOCHARGED INTERNAL COMBUSTION ENGINE COMPRISING A RADIAL COMPRESSOR WITH GUIDE DEVICE ARRANGED IN THE DIFFUSER, AND METHOD FOR OPERATING AN INTERNAL COMBUSTION ENGINE OF SAID TYPE

CROSS REFERENCE TO RELATED APPLICATION

The present application claims priority to German Patent Application No. 102015203171.3, filed Feb. 23, 2015, the entire contents of which are hereby incorporated by reference for all purposes.

FIELD

The present description relates generally to methods and systems for controlling a turbocharger compressor of an internal combustion engine.

BACKGROUND/SUMMARY

Supercharging is the process of increasing the power of an internal combustion engine by compressing a portion of the air required for the combustion process before it reaches the combustion chambers of the cylinders. This is often accomplished using a device known as a turbocharger that is comprised of a compressor and a turbine arranged on a common shaft. The hot exhaust-gas flow from the cylinders is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the air supplied to it (known as charge air), as a result of which supercharging of the cylinders is obtained.

The configuration of the exhaust-gas turbocharging often poses difficulties, wherein it is basically sought to obtain a noticeable performance increase in all engine speed ranges. It is possible to design a turbine with a large cross section so as to be adapted to high engine speeds, that is to say high exhaust-gas flow rates. However, because large turbines possess a relatively large moment of inertia, their rotation is hampered during periods of low exhaust-gas flow rates (e.g., low engine speeds) and their ability to adjust in response to changes in engine speed is poor. It is possible for these disadvantages to be counteracted by reducing the size of the turbine cross section which then increases the pressure at the turbine and increases performance at low engine speeds. However, this approach has problems because the exhaust-gas back pressure upstream of the turbine increases with increasing exhaust-gas flow rates, whereby the charge exchange is adversely affected and fuel consumption is increased. This reduces performance at high engine speeds.

In an attempt to address the above-described effect, the torque characteristic of a supercharged internal combustion engine may be altered by means of multiple turbochargers arranged in parallel. Multiple turbines of relatively small turbine cross section are arranged in parallel, wherein the turbines are activated successively with increasing exhaust-gas flow rate, similarly to a sequential supercharging arrangement. The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

Other attempts to alter the torque characteristic in the lower engine speed range include radial compressors that are equipped with a guide device which comprises blades and which is arranged downstream of the at least one impeller in the housing diffuser. One example approach is shown by U.S. Pat. No. 6,814,540 B2. Therein, the vanes of the diffuser of a centrifugal compressor are attached to a common ring which can be selectively rotated to move to the vanes in unison. A guide device of said type is also described for example in DE 603 07 571 T2, the guide device of which comprises a—preferably rotatable—ring which holds a multiplicity of pivotable guide elements.

However, the inventors herein have recognized potential issues with such systems. As one example, the ring is rotatable only in a limited angle range in order to adjust the guide elements in unison with one another. Additionally, a method utilizing multiple turbochargers in series or parallel can significantly increase the cost and the space required by the supercharging system.

In one example, the issues described above may be addressed by a method for an inexpensive exhaust-gas turbocharging arrangement. The internal combustion engine according to the disclosure is equipped with at least one exhaust-gas turbocharger. In relation to the provision of multiple exhaust-gas turbochargers, the provision of a single exhaust-gas turbocharger also has advantages with regard to weight. Furthermore, the space requirement of the supercharging apparatus in the engine bay is reduced. The method includes a revolving support within the compressor, such that the support together with guide blades can, like the at least one revolving impeller, be continuously rotated or continuously rotate for multiple revolutions about the shaft of the compressor when an electrical auxiliary drive provides the required drive power. By contrast to the impeller, which is connected rotationally conjointly to the compressor shaft, the support is however rotatable relative to the shaft of the compressor. In this way, the impeller of the compressor can perform well at high engine speeds while the revolving support of the guide blades can increase the torque characteristic of the engine at low engine speeds.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A is shown approximately to scale.

DETAILED DESCRIPTION

Figure 1:
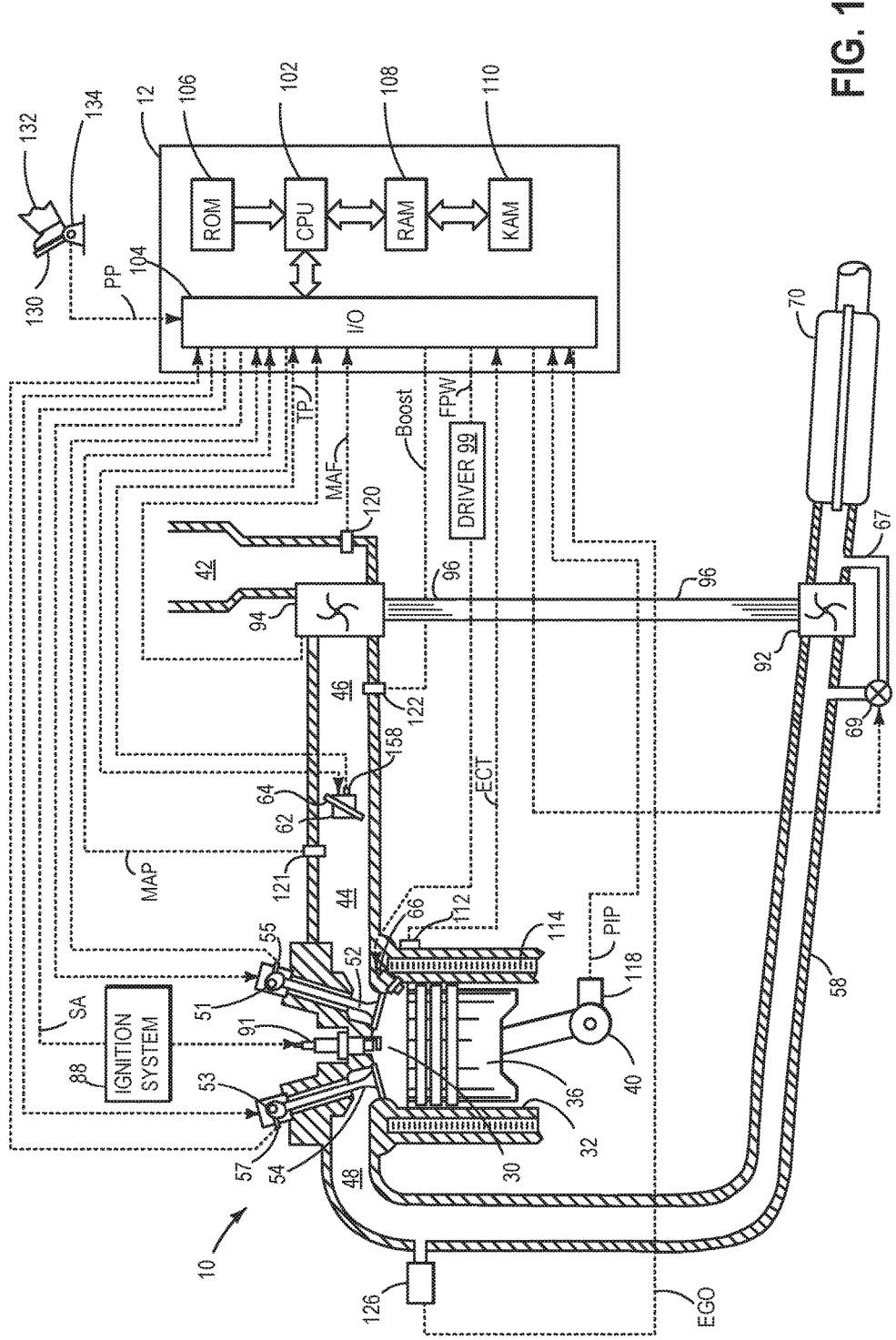
FIG. 1 shows a schematic diagram of an example cylinder within an engine coupled with a controller.

An internal combustion engine of the type mentioned above is used as a motor vehicle drive unit. Within the context of the present disclosure, the expression "internal combustion engine" encompasses diesel engines and Otto-cycle engines and also hybrid internal combustion engines, which utilize a hybrid combustion process, and hybrid drives which comprise the internal combustion engine as well as an electric machine which can be connected in terms of drive to the internal combustion engine and which receives power from the internal combustion engine or which, as a switchable auxiliary drive, additionally outputs power.

In recent years, there has been a trend in development toward small, highly supercharged engines, wherein supercharging is primarily a method of increasing power, in which the air required for the combustion process in the engine is compressed. The economic significance of said engines for the automobile industry is ever increasing.

As mentioned previously, supercharging is often done through the use of an exhaust-gas turbocharger, in which a compressor and a turbine are arranged on the same shaft. A charge-air cooler is commonly provided in the intake system downstream of the compressor, by means of which charge-air cooler the compressed charge air is cooled before it enters the at least one cylinder. The cooler lowers the temperature and thereby increases the density of the charge air, such that the charge-air cooler also contributes to charging of the cylinders, that is to say to a greater air mass. Compression by cooling takes place.

The advantage of an exhaust-gas turbocharger in relation to a mechanical charger is that no mechanical connection for transmitting power exists or is required between charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

As already mentioned, supercharging serves for increasing power. The air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and an increased power-to-weight ratio. If the swept volume is reduced, it is thus possible to shift the load collective toward higher loads, at which the specific fuel consumption is lower.

Supercharging consequently assists in the constant efforts in the development of internal combustion engines to minimize fuel consumption and increase the efficiency of the internal combustion engine.

It is a further basic aim to reduce pollutant emissions. Supercharging can likewise be expedient in solving this problem. With targeted configuration of the supercharging, it is possible specifically to obtain advantages with regard to efficiency and with regard to exhaust-gas emissions.

The configuration of the exhaust-gas turbocharging often poses difficulties, wherein it is basically sought to obtain a noticeable performance increase in all engine speed ranges. However, a torque drop is observed in the event of a certain engine speed $n_{mot}$ being undershot. Said torque drop is understandable if one takes into consideration that the charge pressure ratio is dependent on the turbine pressure ratio. For example, if the engine speed $n_{mot}$ is reduced, this leads to a smaller exhaust-gas mass flow and therefore to a lower turbine pressure ratio. This has the result that, toward lower engine speeds, the charge pressure ratio and the charge pressure likewise decrease, which equates to a torque drop.

It is fundamentally possible for the drop in charge pressure to be counteracted by means of a reduction in the size of the turbine cross section, and the associated increase in the turbine pressure ratio. This however merely shifts the torque drop further in the direction of lower engine speeds. Furthermore, this approach, that is to say the reduction in size of the turbine cross section, has problems, because the exhaust-gas back pressure upstream of the turbine increases with increasing exhaust-gas flow rates, whereby the charge exchange is adversely affected and fuel consumption is increased.

Increasing the torque characteristic of a supercharged internal combustion engine can be achieved for example by means of a small design of the turbine cross section and provision of an exhaust-gas blow-off facility. Such a turbine is also referred to as a wastegate turbine. If the exhaust-gas mass flow exceeds a threshold value, a part of the exhaust-gas flow is, within the course of the so-called exhaust-gas blow-off, conducted via a bypass line past the turbine. Said approach has the disadvantage that the supercharging behavior is inadequate at relatively high engine speeds or in the case of relatively large exhaust-gas flow rates.

The exhaust-gas turbocharger may also be designed with a large turbine cross section so as to be adapted to high engine speeds, that is to say high exhaust-gas flow rates. Here, the intake system is preferably designed in such a way that dynamic supercharging takes place at low engine speeds as a result of wave phenomena. Disadvantages here are the high outlay in terms of construction and the inert behavior during changes in engine speed.

The torque characteristic of a supercharged internal combustion engine may furthermore be increased by means of multiple turbochargers arranged in parallel, that is to say by means of multiple turbines of relatively small turbine cross section arranged in parallel, wherein turbines are activated successively with increasing exhaust-gas flow rate, similarly to a sequential supercharging arrangement.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably increases the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine, wherein a shut-off element is arranged in the bypass line in order to control the exhaust-gas flow conducted past the high-pressure turbine.

The response behavior of an internal combustion engine supercharged in this way is considerably increased in relation to a similar internal combustion engine with single-stage supercharging, because the relatively small high-pressure stage is less inert, and the rotor of a smaller-dimensioned exhaust-gas turbocharger can be accelerated more rapidly.

To realize an inexpensive exhaust-gas turbocharging arrangement, the internal combustion engine according to the disclosure is equipped with at least one exhaust-gas turbocharger. In relation to the provision of multiple exhaust-gas turbochargers, the provision of a single exhaust-gas turbocharger also has advantages with regard to weight. Furthermore, the space requirement of the supercharging apparatus in the engine bay is reduced.

The response behavior of an internal combustion engine with single-stage supercharging suffers if, in order to generate a high charge pressure at full load or at relatively high engine speeds, the compressor is equipped with a large impeller, the rotor of which is more inert and therefore cannot be accelerated as quickly.

A compressor of said type has proven to be unsatisfactory in particular in the presence of relatively small compressor flows, that is to say relatively low charge-air flow rates. If the charge-air flow rate falls, the surge limit in the compressor characteristic map is reached relatively early, that is to say in relation to a two-stage supercharging arrangement. In the presence of relatively small compressor flows, it is not possible for an adequately high charge pressure to be generated, whereby the torque characteristic of the internal combustion engine in the lower engine speed range is noticeably impaired. Surging of the compressor is likely. An at least partial flow reversal in the compressor can be observed. In association with this, increased noise emissions are apparent.

To counteract the above-described effects and to increase the torque characteristic in the lower engine speed range, the radial compressor is equipped with a guide device which comprises blades and which is arranged downstream of the at least one impeller in the housing diffuser. The guide device holds a multiplicity of pivotable guide elements.

One function of the guide device serves for converting the kinetic energy of the compressed charge air into a higher static pressure, and thus for increasing the charge pressure ratio of the compressor, in particular in the presence of low charge-air flow rates.

Against the issues stated above, it is an object of the present disclosure to provide a supercharged internal combustion engine according to the preamble of claim 1. It is a further sub-object of the present disclosure to specify a method for operating an internal combustion engine of said type.

The first sub-object is achieved by way of a supercharged internal combustion engine having an intake system for the supply of charge air, having an exhaust-gas discharge system for the discharge of exhaust gas, and having at least one exhaust-gas turbocharger which comprises a radial turbine arranged in the exhaust-gas discharge system and a radial compressor arranged in the intake system, the compressor being equipped with at least one impeller which is mounted, in a compressor housing, on a rotatable shaft, a diffuser being formed in the compressor housing downstream of the at least one impeller, guide blades of a guide device being arranged in the diffuser, and the guide device comprising an annular support which holds the guide blades of the guide device, which internal combustion engine is distinguished by the fact that the annular support together with guide blades is formed as a support which revolves about the shaft of the compressor, an electric auxiliary drive being provided for driving the support in accordance with demand, by means of which electric auxiliary drive the annular support can have a revolving movement forcibly imparted to it in at least one direction of rotation.

This is achieved by means of an internal combustion engine wherein the annular support together with guide blades is formed as a support which revolves about the shaft of the compressor, an electric auxiliary drive being provided for driving the support in accordance with demand, by means of which electric auxiliary drive the annular support can have a revolving movement forcibly imparted to it in at least one direction of rotation.

The annular support of the internal combustion engine according to the disclosure is a revolving support, such that the support together with guide blades can, like the at least one revolving impeller, be rotated or rotate about the shaft of the compressor when an electrical auxiliary drive provides the required drive power. By contrast to the impeller, which is connected rotationally conjointly to the compressor shaft, the support is however rotatable relative to the shaft of the compressor. With the guide device according to the disclosure, it is advantageously possible for the compressor characteristic map, or the operating behavior of the compressor, to be influenced.

In the presence of low charge-air flow rates, when there is the risk of surging of the compressor and the risk of an adequately high charge pressure not being available upstream of the cylinders, the guide device according to the disclosure can be utilized as a radial blower in order to deliver the charge-air flow through the compressor. In this way, a backward flow in the compressor, that is to say a flow reversal, and the associated noise emissions can be prevented. The torque characteristic of the internal combustion engine in the lower engine speed range is noticeably increased. Here, the bladed support is, by means of the auxiliary drive, driven preferably in the opposite direction to the at least one impeller of the compressor.

With the guide device according to the disclosure, it is however possible for the compressed charge-air flow to be influenced fundamentally when there is the risk of surging as well as in other situations. Accordingly, by means of a suitable rotational movement of the bladed support, it is possible to influence the inflow angle of the charge-air flow emerging from the rotor as said charge-air flow enters the guide device. The conversion of the kinetic energy of the compressed charge air into static pressure can be optimized in this way. It is thus possible for the charge pressure ratio of the compressor, in particular in the presence of low charge-air flow rates, to be increased. Here, the bladed support is, by means of the auxiliary drive, driven preferably in the same direction as the at least one impeller of the compressor. The first object on which the disclosure is based is thereby achieved, that is to say a supercharged internal combustion engine is provided whose exhaust-gas turbocharging arrangement is further increased.

According to the disclosure, the compressor of the at least one exhaust-gas turbocharger is a radial compressor. A radial compressor is a compressor in the case of which the flow exiting the rotor blades runs substantially radially. In the context of the present disclosure, "substantially radially" means that the speed component in the radial direction is greater than the axial speed component. This design permits dense packaging of the exhaust-gas turbocharger and thus of the supercharging arrangement as a whole. The compressor housing may be in the form of a spiral or worm housing, wherein the diversion of the charge-air flow in the compressor of the exhaust-gas turbocharger is advantageously utilized for conducting the compressed charge air on the shortest path from the outlet side, on which the turbine of the exhaust-gas turbocharger is commonly arranged, to the inlet side.

According to the disclosure, the turbine of the at least one exhaust-gas turbocharger is a radial turbine. This embodiment likewise permits dense packaging of the exhaust-gas turbocharger and thus of the supercharging arrangement as a whole. A radial turbine is a turbine in the case of which the inflow runs substantially radially. Embodiments are advantageous in which the compressor of the at least one exhaust-gas turbocharger has an inlet region which runs coaxially with respect to the shaft of the compressor and which is designed such that the inflow of the charge air into the compressor runs substantially axially. In the case of an axial inflow to the compressor, a diversion of the charge-air flow in the intake system upstream of the at least one impeller is often omitted, whereby pressure losses in the charge-air flow owing to flow diversion are avoided, and the pressure of the charge air at the inlet into the compressor of the exhaust-gas turbocharger is increased. Further advantageous embodiments of the supercharged internal combustion engine will be discussed in conjunction with the subclaims.

Embodiments of the supercharged internal combustion engine are advantageous in which the annular support can, by means of the auxiliary drive, be rotated in the opposite direction to the at least one impeller of the compressor. A rotational movement of the bladed support in the opposite direction to the at least one impeller has proven to be advantageous in particular in the presence of low charge-air flow rates in order to counteract surging of the compressor. The guide device according to the disclosure is in this case used as a radial blower in order to draw the charge-air flow in through the compressor. A flow reversal in the compressor is prevented in this way.

Embodiments of the supercharged internal combustion engine are also advantageous in which the annular support can, by means of the auxiliary drive, be rotated in the same direction as the at least one impeller of the compressor. A rotational movement of the bladed support in the same direction of the at least one impeller has proven to be advantageous for the conversion of the kinetic energy of the charge-air flow into static pressure. The pressure at the outlet of the compressor, and thus the charge pressure ratio of the compressor, can be increased. By means of a suitable rotational movement of the bladed support, it is possible to influence the inflow angle of the charge-air flow as it enters the guide device.

Embodiments of the supercharged internal combustion engine are advantageous in which the auxiliary drive is an electric motor which comprises a stator and a rotor. By means of an electric motor, it is possible for the bladed support to be driven in accordance with demand, without dependence on the present operating state of the internal combustion engine. An electric motor furthermore makes it possible, in a simple manner, for a revolving movement to be forcibly imparted to the annular support in different directions of rotation. For example, by way of a reversal of the direction of the electrical current, it is possible to switch from a rotational movement in the opposite direction to a rotational movement in the same direction. In this connection, embodiments of the supercharged internal combustion engine are advantageous in which the stator is arranged and mounted at least inter alia in the compressor housing.

In the case of a direct-current motor, the static stator may be in the form of a permanent magnet. Alternatively, external excitation is realized by way of an exciter coil, as in the case of an alternating-current motor. If electrical current is conducted through the coil, a magnetic field is generated. Therefore, embodiments of the supercharged internal combustion engine are also advantageous in which the stator comprises an energizable coil for generating a magnetic field. In this connection, embodiments of the supercharged internal combustion engine are advantageous in which the rotor is connected to the annular support.

In the interior of the stator there is arranged a rotor which is arranged and mounted such that it can rotate in the magnetic field of the stator. The rotor may likewise have a coil with an iron core that serves as an armature. Then, if the rotor is energized, a magnetic field is generated in the rotor too, which magnetic field interacts with the magnetic field of the stator, in such a way that the rotor rotates. In this way, electrical energy can be converted into kinetic energy, or into a movement of the rotor and thus of the support. The magnetic field in the rotor is static relative to the stator. Embodiments of the supercharged internal combustion engine may therefore also be advantageous in which the rotor comprises an energizable coil for generating a magnetic field. Embodiments of the supercharged internal combustion engine are however also advantageous in which the rotor comprises at least one permanent magnet for generating a magnetic field. In these embodiments the stator may comprise an energizable coil for generating a magnetic field.

By contrast to the embodiment described above with regard to an energizable rotor coil, which requires a cyclic supply of electrical current to the rotating coil of the rotor, the present variant is one which requires no electrical current reversal, and thus no brushes. This type of electric motor is less complex, has a smaller space requirement, and is therefore suitable for applications with little structural space. A further advantage of the permanent magnets is the greater cogging torque when the electric motor is deactivated, that is to say when the stator coil, that is to say exciter coil, is not energized.

In the case of internal combustion engines with a bearing housing for accommodating the rotatable shaft of the compressor, embodiments are advantageous in which the rotor is mounted rotatably on the bearing housing. Embodiments of the supercharged internal combustion engine are advantageous in which a collecting line for the compressed charge air is provided in the compressor housing downstream of the diffuser. Embodiments of the supercharged internal combustion engine are advantageous in which a charge-air cooler is arranged in the intake system downstream of the compressor. The advantages of charge-air cooling have already been explained.

In the case of multiple-stage supercharging, embodiments may be advantageous in which a charge-air cooler is arranged in the intake system between the compressors. The charge-air cooler lowers the temperature of the charge air compressed in the low-pressure stage and thereby also increases the density of the charge air, as a result of which the compression in the high-pressure stage is increased and the outlet temperature of the high-pressure stage can be lowered given an identical overall pressure ratio of the supercharging assembly. This also affords protection against thermal overloading.

Embodiments of the supercharged internal combustion engine are advantageous in which the guide blades are designed to be movable relative to the annular support, such that the guide device is an adjustable guide device. The inflow angle of the charge-air flow as it enters the guide device can be optimized by means of adjustable guide blades.

The second sub-object on which the disclosure is based, specifically that of specifying a method for operating a supercharged internal combustion engine of a type described above, is achieved by means of a method wherein, below a first predefinable engine speed $n_{mot,1}$ of the internal combustion engine, a revolving movement in the opposite direction to the direction of rotation of the at least one impeller of the compressor is forcibly imparted to the annular support by means of the activated auxiliary drive.

That which has been stated in connection with the internal combustion engine according to the disclosure likewise applies to the method according to the disclosure.

The risk of surging exists in particular at low engine speeds $n_{mot}$, owing to the low charge-air flow rates that prevail then. According to the disclosure, the guide device is preferably used as a radial blower in order to draw the charge-air flow through the compressor. Method variants are advantageous in which, above a second predefinable engine speed $n_{mot,2}$ of the internal combustion engine, a revolving movement in the same direction as the direction of rotation of the at least one impeller of the compressor is forcibly imparted to the annular support by means of the activated auxiliary drive.

At relatively high engine speeds $n_{mot}$, and in the presence of relatively high charge-air flow rates, the bladed support can be utilized to optimize the inflow angle, or convert the kinetic energy of the charge-air flow into static pressure as effectively as possible. Therefore, method variants are also advantageous in which, proceeding from an oppositely-directed rotational movement of the support, in the event of a third predefinable engine speed $n_{mot,3}$ of the internal combustion engine being exceeded, the rotational movement of the support is reversed, such that a revolving movement in the same direction as the direction of rotation of the at least one impeller of the compressor is forcibly imparted to the annular support by means of the auxiliary drive.

Method variants are basically advantageous in which the auxiliary drive is deactivated in order to utilize the guide device as a non-revolving, static guide device. Then, the guide device is a static guide device, wherein the cogging torque of the electric drive ensures adequate fixing in a static position.

Referring now to FIG. 1, it shows a schematic depiction of a spark ignition internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 1, intake valve 52 and exhaust valve 54 may be controlled by cam actuation via respective cam actuation systems 51 and 53. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 91 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 94 arranged along intake passage 42. For a turbocharger, compressor 94 may be at least partially driven by an exhaust turbine 92 (e.g., via a shaft) arranged along exhaust passage 58. Compressor 94 draws air from intake passage 42 to supply boost chamber 46. Exhaust gases spin exhaust turbine 92 which is coupled to compressor 94 via shaft 96. For a supercharger, compressor 94 may be at least partially driven by the engine and/or an electric machine, and may not include an exhaust turbine. Thus, the amount of compression provided to one or more cylinders of the engine via a turbocharger or supercharger may be varied by controller 12. The compressor may contain an additional electric machine directly coupled to a guide device capable of continuous rotation positioned within the compressor (as shown by FIG. 2 and explained further below). The additional electric machine and the rotation of the guide device of compressor 94 may also be controlled by controller 12.

A wastegate 69 may be coupled across exhaust turbine 92 in a turbocharger. Specifically, wastegate 69 may be included in a bypass passage 67 coupled between an inlet and outlet of the exhaust turbine 92. By adjusting a position of wastegate 69, an amount of boost provided by the exhaust turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control airflow from intake boost chamber 46 to intake manifold 44 and combustion chamber 30 (and other engine cylinders). The position of throttle plate 64 may be provided to controller 12 by throttle position signal TP from throttle position sensor 158.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126 and exhaust turbine 92. Device 70 may be a three way catalyst (TWC), NOx trap, various other emission control devices, or combinations thereof.

An exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, wastegate 69, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a profile ignition pickup signal (PIP) from Hall effect sensor 118 (or other type) coupled to crankshaft 40; a measurement of air mass entering the engine from mass airflow sensor 120; and a measurement of throttle position from sensor 158. Barometric pressure may be sensed (sensor not shown) for processing by controller 12. The intake flow and collection line pressure (such as the collection line of FIG. 2) of the compressor 94 may also be sensed (sensors not shown) for processing by controller 12. In a preferred aspect of the present description, crankshaft sensor 118, which may be used as an engine speed sensor, may produce a predetermined number of equally spaced pulses for each revolution of the crankshaft from which engine speed (RPM) can be determined. Such pulses may be relayed to controller 12 as a profile ignition pickup signal (PIP) as mentioned above.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g., when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g., when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as spark plug 91, resulting in combustion. Additionally or alternatively compression may be used to ignite the air/fuel mixture. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, early intake valve closing, or various other examples.

Figure 2A:
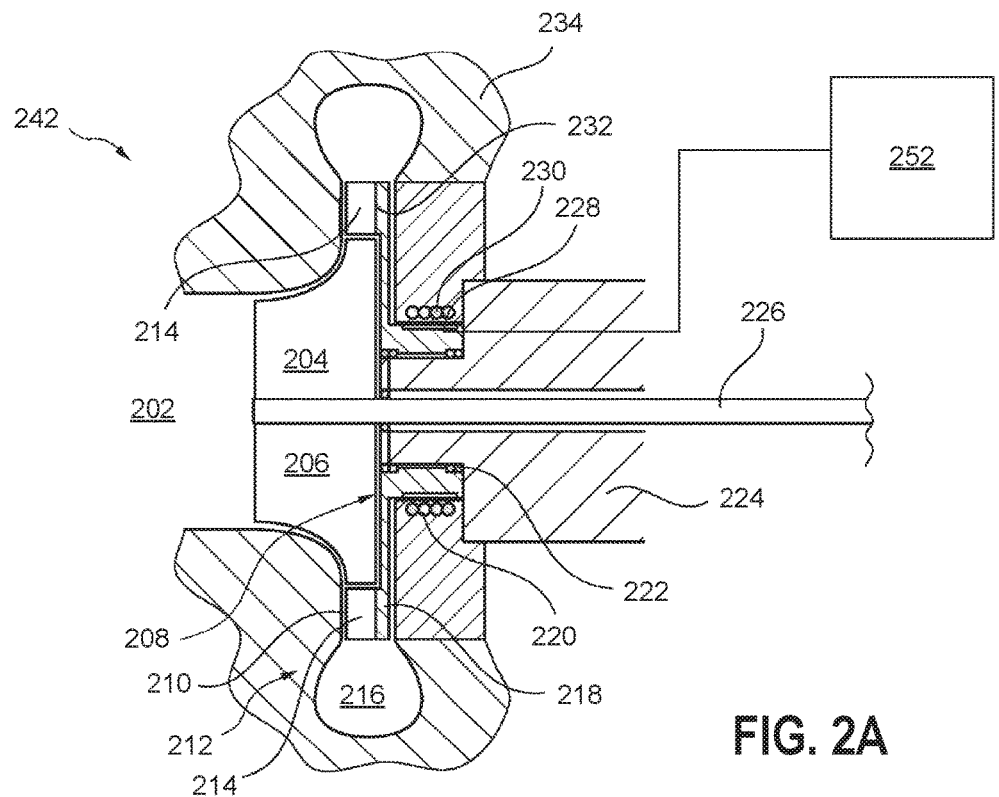
FIG. 2A schematically shows a compressor arranged in an intake system of an internal combustion engine together with a guide device partially in half-section.
Figure 2B:
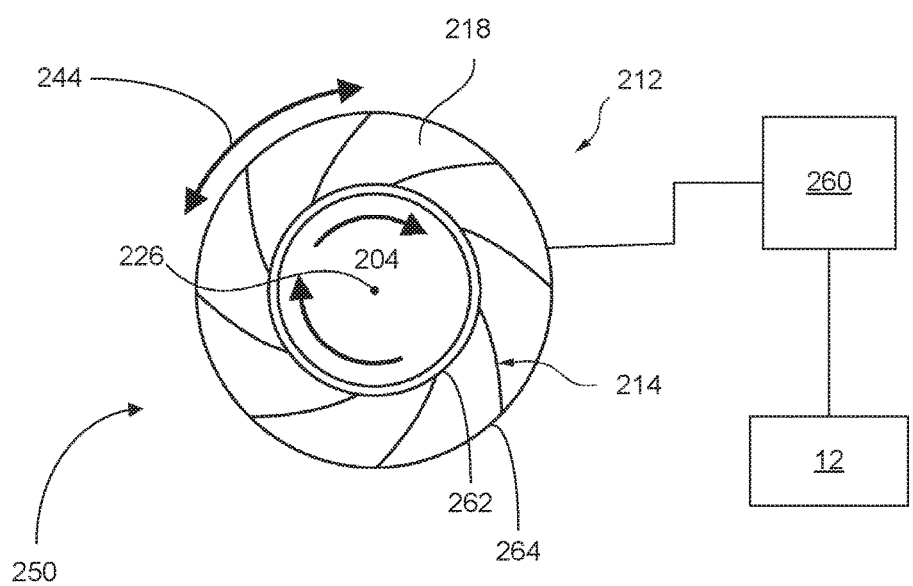
FIG. 2B schematically shows a side view of the guide device of the compressor.

FIG. 2A schematically shows a compressor 242 (such as compressor 94 shown in FIG. 1), arranged in the intake system 202, of a first embodiment of the internal combustion engine together with guide device 212, partially in half-section. FIG. 2B shows a side view of guide device 212 of the compressor 242 shown in FIG. 2A.

For the supply of the charge air to the cylinders, the internal combustion engine has an intake system 202. For the supercharging of the cylinders, an exhaust-gas turbocharger is provided which comprises a turbine (not illustrated) arranged in the exhaust-gas discharge system and a compressor 242 arranged in the intake system 202.

The compressor 242 is a radial compressor, in the housing 234 of which an impeller 204 which comprises rotor blades 206 is mounted on a rotatable shaft 226. The shaft 226 of the compressor 242 is mounted rotatably in a bearing housing 224. The compressor 242 of the exhaust-gas turbocharger has an inlet region which runs coaxially with respect to the shaft 226 of the compressor 242 and which is designed such that the inflow of the charge air to the compressor 242 of the exhaust-gas turbocharger runs substantially axially. The compressor housing 234 is in the form of a spiral housing, wherein, downstream of the impeller 204, the charge-air flow flows through a diffuser 210, the flow cross section of which increases in the flow direction owing to the increasing spacing to the shaft 226. The diffuser 210 issues into a collecting line (which hereafter may be referred to as a volute) 216 for the compressed charge air, which collecting line lies in spiral fashion around the diffuser 210.

The diffuser 210 includes a guide device 212 is provided which comprises an annular support 218 which holds, that is to say supports, the guide blades (which may also be referred to as vanes) 214 of the guide device 212. The annular support 218 together with guide blades 214 is formed as a support 218 which revolves about the shaft 226 of the compressor 242, an electric auxiliary drive 208 being provided for driving the annular support 218 in accordance with demand, by means of which electric auxiliary drive the annular support 218 can have a revolving movement forcibly imparted to it in different, that is to say both, directions of rotation (see also side view 250).

In the present case, the auxiliary drive 208 is an electric motor (which may also be referred to as an electric machine) which comprises a stator 220 and a rotor 232. The electric machine 208 is directly coupled to the annular support 218 and may be additionally connected with an alternate engine component 252 capable of energy storage (such as an alternator). The stator 220 is arranged and mounted in the compressor housing 234 and has an energizable coil 230 for generating a magnetic field. If electrical current is conducted through said exciter coil 230, an externally excited magnetic field is generated. The rotor 232 has a permanent magnet 228 for generating a magnetic field, wherein the rotor 232 is arranged in the interior of the stator 220 and is mounted such that it can rotate in the magnetic field of the stator 220. The bearing arrangement 222 of the rotor 232, and thus the bearing arrangement 222 of the annular support 218, which is connected to the rotor 232, is accommodated by the bearing housing 224.

If the stator 220 is energized, a magnetic field is generated in the stator 220, which magnetic field interacts with the magnetic field of the permanent magnet 228 of the rotor 232, such that the rotor 232, and the annular support 218 which is connected to the rotor 232, rotate.

Additionally, the annular support 218 of the guide device 212 may be driven (e.g., continuously rotated through multiple revolutions) by the force of intake air passing through the compressor. In this situation, the magnetic field of the rotor 232 may interact with the exciter coils 230 of the stator 220 to produce a current within the stator 220. The current produced within the stator 220 by this condition may be routed to the alternate engine component 252 for the purpose of storing electrical charge and/or powering engine electrical components.

The vanes 214 of the guide device 212 may each be pivotable in order to restrict or allow air flow through the compressor 242 as determined by controller 12 via an additional actuator 260 (shown in FIG. 2B) connected between the controller 12 and the guide device 212. The pivot axis for each vane 214 is parallel to the shaft 226 and is aligned with an end of the vane 214 along its length (e.g., the longest length of the vane) corresponding to a point on either an inner 262 or outer 264 circumference of the annular support 218. In one embodiment, all pivot axes are along the inner circumference 262 of the annular support 218. In another embodiment, all pivot axes are along the outer circumference 264 of the annular support 218.

FIG. 2B schematically shows, in a side view 250, the impeller 204 of the compressor 242 of the embodiment illustrated in FIG. 2B, together with guide device 212. It is sought merely to explain the additional features in relation to FIG. 2B, for which reason reference is made otherwise to FIG. 2A. The same reference symbols have been used for the same components.

By means of the auxiliary drive 208, the annular support 218 together with guide blades 214 can be rotated, that is to say can revolve, in the opposite direction to the impeller 204 of the compressor 242 and in the same direction as the impeller 204 of the compressor 242 (see the double arrow 244 on the outer circumference).

An oppositely-directed rotational movement of the annular support 218 has proven to be advantageous for preventing surging, wherein the guide device 212 is operated as a radial blower in order to draw the low charge-air flow rates in through the compressor 242.

A rotational movement of the annular support 218 in the same direction assists the conversion of the kinetic energy of the charge-air flow into static pressure. The charge pressure ratio of the compressor 242 can be increased, and thus the torque characteristic of the internal combustion engine can be increased.

By means of a suitable rotational movement of the annular support 218, it is possible to influence the inflow angle of the charge-air flow as it enters the guide device 212.

Figure 3:
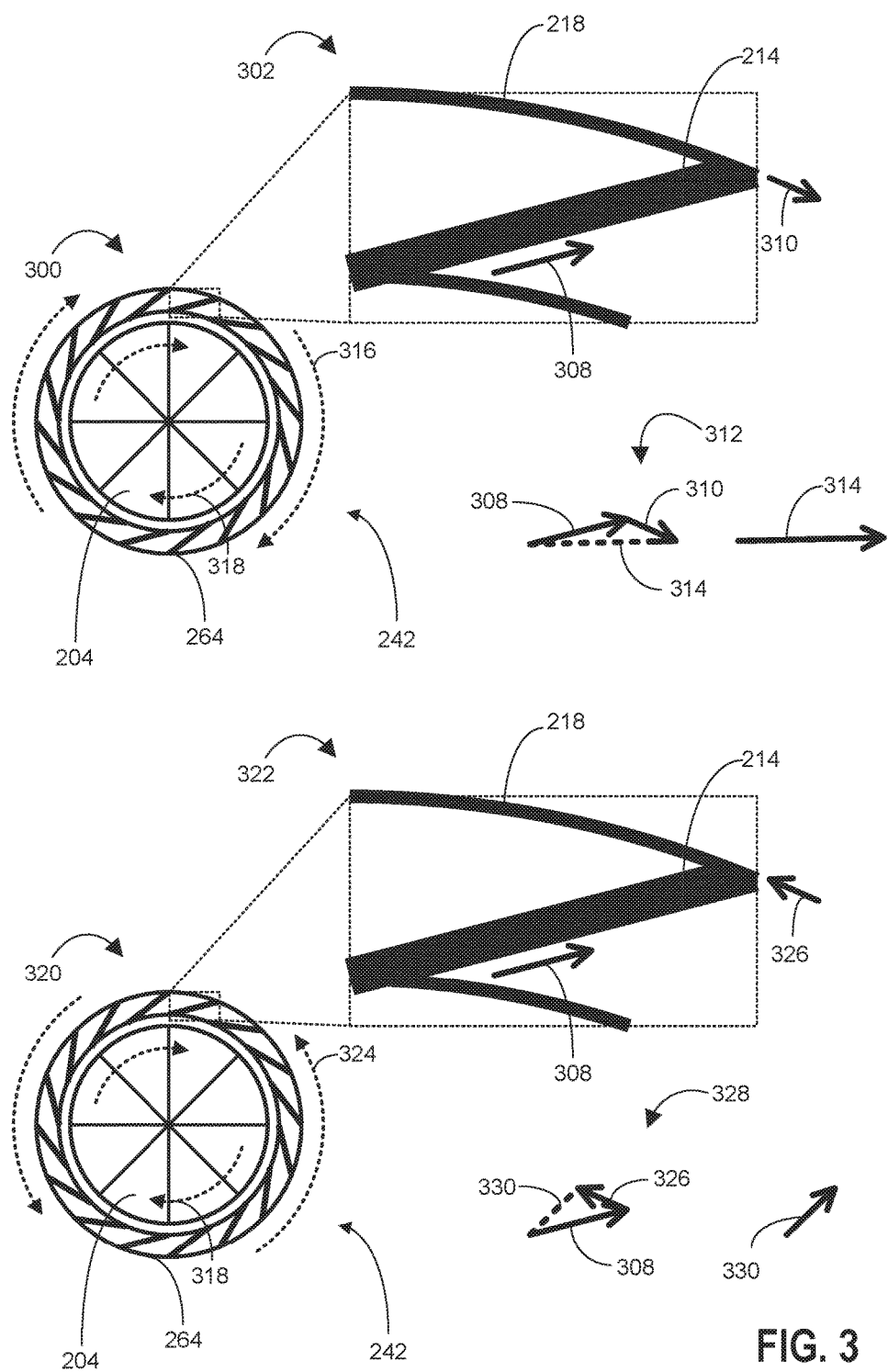
FIG. 3 schematically shows a change in momentum of the compressor intake air due to the rotation of the diffuser.

FIG. 3 depicts a first status 300 of the impeller 204 rotating in a first direction 318 and annular support 218 with vanes 214. An enlarged view 302 of the annular support 218 can be seen along with intake air velocity vector 308 for air traveling from the impeller 204 to the annular support 218. The first status 300 depicts the annular support 218 rotating in a direction 316 that coincides with the direction 318 of the rotation of the impeller 204. A tangential velocity vector 310 can also be seen as a representation of the tangential velocity of a diffuser vane 214 at a point along the outer circumference 264 of the annular support 218 relative to the center of the impeller 204.

Inset 312 depicts the vector addition of intake air velocity vector 308 and tangential velocity vector 310. The magnitude of the intake air velocity 308 is increased by the rotation of the annular support 218 due to the addition of tangential velocity 310 as the intake air exits the annular support 218. The resulting velocity vector 314 of the air has a magnitude greater than that of the initial intake air velocity 308. The annular support 218 may be rotated in this way to increase boost pressure, move the operating point of the compressor 242 away from the surge line, and to decrease the torque time of the engine.

A second status 320 depicts the impeller 204 rotating in a first direction 318 and annular support 218 rotating in a direction 324 that is opposite to the direction 318 of the rotation of the impeller 204. An enlarged view 322 of the annular support 218 can be seen along with intake air velocity vector 308 for air traveling from the impeller 204 to the annular support 218. A tangential velocity vector 326 can also be seen as a representation of the tangential velocity of a diffuser vane 214 at a point along the outer circumference 264 of the annular support 218 relative to the center of the impeller 204.

Inset 328 depicts the vector addition of intake air velocity vector 308 and tangential velocity vector 326. The magnitude of the intake air velocity 308 is decreased by the rotation of the annular support 218 due to the addition of tangential velocity 326 as the intake air exits the annular support 218. The resulting velocity vector 330 of the air has a magnitude less than that of the initial intake air velocity 308. The annular support 218 may be rotated in this way to reduce the velocity 308 and increase the static pressure of the air exiting the vanes 214.

A third status exists (not shown) in which the annular support 218 does not rotate but rather is held in a fixed position relative to the impeller 204. In this way, the annular support 218 and vanes 214 guide the air from the impeller 204 without the transfer of tangential velocity that would result from a rotation of the annular support 218. As explained below with reference to FIG. 4, this status may be utilized for periods of engine load during which the compressor 242 is not at risk of surging and a stationary control of air flow is desirable.

Figure 4:
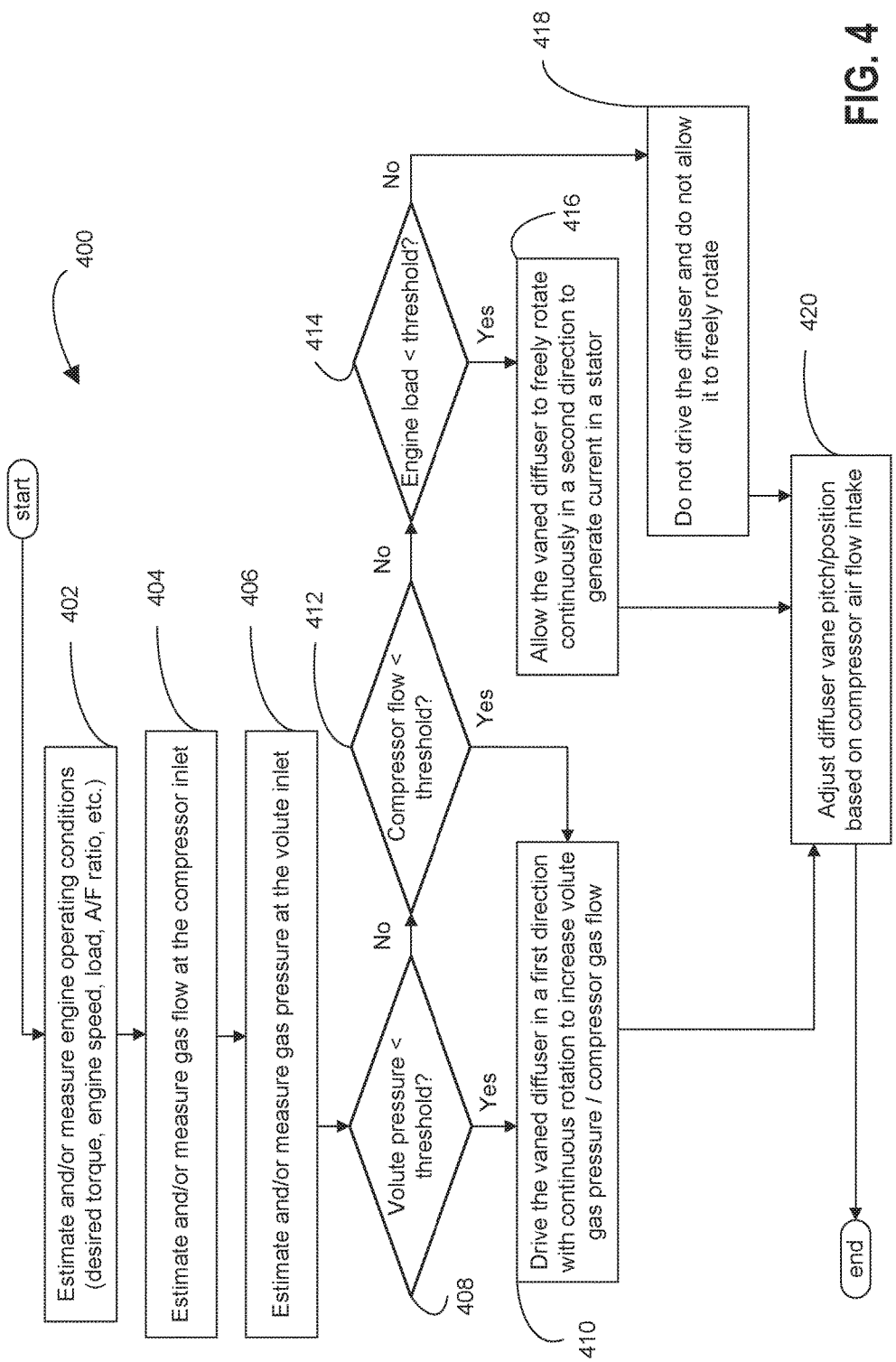
FIG. 4 shows a flow chart depicting a method of operation of the vaned diffuser under different engine conditions.

FIG. 4 shows a flowchart 400 depicting a method of adjusting the rotation of a guide device (such as guide device 212) of a diffuser (such as diffuser 210) in response to engine and turbocharger conditions. At 402, the method includes estimating and/or measuring engine operating conditions. In one example, the engine operating conditions estimated/measured at 402 may include parameters such as desired torque, engine speed, engine load, air/fuel ratio, etc. At 404, the method includes estimating and/or measuring gas flow at the inlet of a compressor (such as compressor 242). In one example, this may include a controller (such as controller 12) estimating gas flow at the compressor inlet based on an output of a flow rate sensor arranged proximate to the compressor inlet. At 406, the method includes estimating/measuring gas pressure within a volute (such as volute 216) of the turbocharger compressor. In one example, this may include a controller (such as controller 12) estimating gas pressure within the volute based on an output of a pressure sensor arranged proximate to the volute.

The method at 408 includes determining if the volute pressure estimated and/or measured at 406 is less than a threshold pressure $p_1$. In one example, the threshold pressure $p_1$ may be determined based on a surge line of an individual compressor and may have a different value for different compressors. If the estimated/measured value of the gas pressure within the volute is less than the threshold pressure $p_1$, the method continues to 410 where the controller may signal a first actuator (such as electric machine 208) to rotate the guide device continuously in a first direction for multiple revolutions. In this way, the guide device may function as a radial blower to increase the pressure within the volute to provide additional boost and/or prevent surging of the compressor (as described in the discussion above with reference to FIG. 3). The method may continue to 420 to adjust the pitch of vanes (such as vanes 214) of the guide device of the diffuser based one or more engine operating conditions. In one example, the method at 420 may include adjusting the pitch (e.g., angle or pivot position) of the vanes via a second actuator (such as actuator 260) coupled to the vanes based on the estimated/measured value of the inflow gas flow rate to the compressor.

The method includes alternatively at 408, if the estimated/measured value of the gas pressure within the volute is in excess of the threshold pressure $p_1$, the method continues to 412 where the estimated/measured flow of gas into the compressor is compared to a threshold flow rate $f_1$. In one example, the threshold flow $f_1$ may be determined based on a surge line of an individual compressor and may have different values for different compressors. The threshold flow rate $f_1$ may correspond to a flow rate that, for a given pressure in the volute, is adequate for preventing a backflow of gas (e.g., surge) through the compressor.

The method includes at 412 that if the estimated/measured value for the flow of gas into the compressor is below the threshold flow rate $f_1$ and the estimated/measured value of the pressure in the volute is in excess of the threshold pressure $p_1$, the method continues to 410 where the controller may signal the first actuator to rotate the guide device continuously in the first direction for multiple revolutions. In this way, the flow of gas into the compressor may be augmented by the rotational motion of the guide device (as described in the discussion of FIG. 3). Additionally, the method may continue to 420 where the pitch of the vanes of the guide device may be modified by the second actuator based on the estimated/measured value of the inflow gas to the compressor.

The method includes alternatively at 412 that if the estimated/measured value of the pressure in the volute is greater than the threshold pressure $p_1$ and the estimated/measured value of the flow of gas into the compressor is greater than the threshold flow rate $f_1$, the method continues to 414 where a comparison is made between the estimated/measured value for engine load and a threshold value for the engine load $l_1$.

The method includes at 414 that if the estimated/measured value for engine load is less than the threshold value for engine load $l_1$, the method then continues to 416 where the controller may signal the first actuator to allow the guide device to rotate freely in a second direction (opposite to the first direction described in the state 410). In this state the rotation of the guide device (and therefore a rotor, such as rotor 232, with one or more permanent magnets, such as permanent magnets 228) is a result of momentum transferred by the flow of gases into the compressor. In this situation, the magnetic field of the rotor may interact with exciter coils (such as exciter coils 230) of a stator (such as stator 220) to produce a current within the stator. The current produced within the stator by this condition may be routed to an alternate engine component (such as alternate engine component 252) for the purpose of storing electrical charge and/or powering engine electrical components. The method may then continue to 420, where the pitch of the vanes of the guide device may be modified by the second actuator based on the estimated/measured value of the inflow gas to the compressor.

The method alternatively includes at 414 that if the estimated/measured value for engine load is greater than the threshold value for engine load $l_1$, the method continues to 418 where the controller may signal the first actuator to hold the guide device in a stationary orientation relative to the rotation of an impeller (such as impeller 204). In this state, the guide device is semi-rotatable such that it may be rotated by the first actuator in increments for the purpose of modifying the circumferential position of the vanes in unison relative to the impeller to facilitate the guidance of gases through the compressor. However, in this state the guide device does not rotate continuously or for multiple revolutions. Instead, the guide device is utilized as a stationary guide with incremental rotational changes possible via the first actuator. The method then continues to 420 where the pitch of the vanes 214 of the guide device 212 may be modified by the second actuator based on the estimated/measured value of the inflow gas to the compressor 242.

In this way, the air flow through the compressor may be modified by the continuous rotation through multiple revolutions of the guide device of the diffuser in addition to the adjustment of the pivot and position of the diffuser vanes. The speed and direction of continuous rotation of the guide device of the diffuser may be modified based on engine and turbocharger operating conditions. Further, a technical effect of adjusting via an electric machine a speed of continuous rotation of the annular support of the diffuser of the compressor about the shaft of the compressor based on one or more engine operating conditions is to prevent surge of the compressor, augment gas flow into the compressor, provide additional boost pressure, and convert airflow kinetic energy into electrical energy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising:

an intake system for the supply of charge air;

an exhaust-gas discharge system for the discharge of exhaust gas; and at least one exhaust-gas turbocharger which comprises a radial turbine arranged in the exhaust-gas discharge system and a radial compressor arranged in the intake system, the compressor being equipped with at least one impeller which is mounted, in a compressor housing, on a rotatable shaft, the rotatable shaft mounted rotatably in a bearing housing, a diffuser being formed in the compressor housing downstream of the at least one impeller, guide blades of a guide device being arranged in the diffuser, and the guide device comprising an annular support which holds the guide blades of the guide device, wherein the annular support, together with the guide blades, revolves around the shaft of the compressor, an electric motor surrounding the bearing housing and directly coupled to the annular support to drive rotation of the annular support in accordance with demand, where the electric motor forcibly imparts revolving movement to the annular support in at least one direction of rotation and where the electric motor includes a rotor mounted rotatably on the bearing housing and surrounding the rotatable shaft.

2. The supercharged internal combustion engine as claimed in claim 1, further comprising a controller including instructions stored in non-transitory memory for: via the electric motor, rotating the annular support in a first direction, opposite the direction of rotation of the at least one impeller of the compressor, during a first engine operating condition, and rotating the annular support in a second direction, the same direction of rotation as the at least one impeller of the compressor, during a second engine operating condition.

3. The supercharged internal combustion engine as claimed in claim 1, wherein the electric motor includes a stator arranged and mounted around the bearing housing, wherein the rotor is connected to the annular support, and wherein the annular support is arranged between the electric motor and the at least one impeller, relative to an axial direction.

4. The supercharged internal combustion engine as claimed in claim 3, wherein the stator comprises an energizable coil for generating a magnetic field.

5. The supercharged internal combustion engine as claimed in claim 4, further comprising an alternate engine component capable of energy storage and coupled to the electric motor, where current produced within the stator is routed to the alternate engine component.

6. The supercharged internal combustion engine as claimed in claim 1, wherein the rotor comprises an energizable coil for generating a magnetic field.

7. The supercharged internal combustion engine as claimed in claim 1, wherein the rotor comprises at least one permanent magnet for generating a magnetic field.

8. The supercharged internal combustion engine as claimed in claim 1, wherein the annular support is arranged rearward of the at least one impeller and the electric motor is arranged rearward of the annular support.

9. The supercharged internal combustion engine as claimed in claim 1, wherein a collecting line for compressed charge air is provided in the compressor housing downstream of the diffuser and wherein a charge-air cooler is arranged in the intake system downstream of the compressor.

10. The supercharged internal combustion engine as claimed in claim 1, wherein the guide blades are designed to be movable relative to the annular support, such that the guide device is an adjustable guide device, and further comprising an actuator connected to the guide device and adapted to adjust a pitch of the guide blades.

11. A method for operating a supercharged internal combustion engine, comprising:
   determining an engine speed of the internal combustion engine;
   in response to the determined engine speed being below a first predefinable engine speed $n_{mot,1}$, driving a rotational movement of an annular support of a guide device of a diffuser of a turbocharger compressor, the diffuser positioned downstream of an impeller mounted in a compressor housing on a rotatable shaft and formed in the compressor housing, around the shaft in an opposite direction to a direction of rotation of the impeller via an electric motor coupled with the annular support, where the guide device includes guide blades arranged in the diffuser and held by the annular support, the guide blades angled in a first direction around a circumference of the annular support; and
   in response to the determined engine speed being above a second predefinable engine speed $n_{mot,2}$ of the internal combustion engine, driving the rotational movement of the annular support in the same direction as the direction of rotation of the impeller via the electric motor, the guide blades angled in the first direction around the circumference of the annular support.

12. The method as claimed in claim 11, wherein, proceeding from an oppositely-directed rotational movement of the annular support, in response to the determined engine speed exceeding a third predefinable engine speed $n_{mot,3}$ of the internal combustion engine, reversing the rotational movement of the annular support, such that the rotational movement of the annular support is in the same direction as the direction of rotation of the impeller via the electric motor.

13. The method as claimed in one of claim 11, further comprising deactivating the electric motor in order to utilize the guide device as a non-revolving, static guide device in response to the determined engine speed exceeding a fourth predefinable engine speed $n_{mot,4}$.

14. A method, comprising:
   adjusting, via an electric motor, a speed of continuous rotation of an annular support of a diffuser of a compressor around a shaft of the compressor based on one or more engine operating conditions, the diffuser positioned downstream of an impeller of the compressor driven by the shaft, the electric motor coupled to the annular support, where adjusting rotation of the annular support includes:
   during a first condition when a volute pressure of a volute of the compressor is less than a first threshold or when the volute pressure is not less than the first threshold and an air flow rate through the compressor is less than a second threshold, driving rotation of the annular support of the diffuser in a first direction;
   during a second condition when the volute pressure is not less than the first threshold, the air flow rate through the compressor is not less than the second threshold, and engine load is less than a third threshold, not driving the annular support of the diffuser and allowing the annular support to freely rotate in a second direction, opposite the first direction; and
   during a third condition when the volute pressure is not less than the first threshold, the air flow rate through the compressor is not less than the second threshold, and the engine load is not less than the third threshold, not driving the annular support of the diffuser and holding the annular support in a stationary position relative to the shaft.

15. The method of claim 14, further comprising adjusting a position of pivotable vanes arranged on the annular support of the diffuser based on an exhaust flow rate through the compressor.

16. The method of claim 15, wherein adjusting the position of the pivotable vanes is actuated via a second auxiliary drive coupled to the pivotable vanes, and wherein both the electric motor and the second auxiliary device are controlled via an engine controller.

17. The method of claim 15, wherein adjusting the position of the pivotable vanes includes decreasing a pitch of the pivotable vanes to decrease the air flow rate through the compressor in response to the air flow rate being greater than a threshold and increasing the pitch of the pivotable vanes to increase the air flow rate through the compressor in response to the air flow rate being less than the threshold.

18. The method of claim 14, further comprising driving the impeller via the shaft in the second direction during driving the rotation of the annular support of the diffuser in the first direction.

* * * * *